United States Patent
Allen et al.

(10) Patent No.: US 10,083,477 B2
(45) Date of Patent: Sep. 25, 2018

(54) BIOMETRIC AND GEOPHYSICAL SENSOR-BASED SORTING AND DISPLAYING OF ECOMMERCE PRODUCT REVIEWS

(71) Applicant: INTERNATIONAL BUSINESS MACHINES CORPORATION, Armonk, NY (US)

(72) Inventors: Corville O. Allen, Morrisville, NC (US); Bernadette A. Carter, Raleigh, NC (US); Rahul Ghosh, Morrisville, NC (US); Joseph N. Kozhaya, Morrisville, NC (US); Dana L. Price, Surf City, NC (US)

(73) Assignee: International Business Machines Corporation, Armonk, NY (US)

( * ) Notice: Subject to any disclaimer, the term of this patent is extended or adjusted under 35 U.S.C. 154(b) by 484 days.

(21) Appl. No.: 14/709,565

(22) Filed: May 12, 2015

(65) Prior Publication Data
US 2016/0335701 A1 Nov. 17, 2016

(51) Int. Cl.
*G06Q 30/00* (2012.01)
*G06Q 30/06* (2012.01)

(52) U.S. Cl.
CPC ..... *G06Q 30/0631* (2013.01); *G06Q 30/0619* (2013.01)

(58) Field of Classification Search
CPC .................................. G06Q 30/0601–30/0645
See application file for complete search history.

(56) References Cited

U.S. PATENT DOCUMENTS

| | | |
|---|---|---|
| 8,229,782 B1 | 7/2012 | Adams et al. |
| 2013/0006881 A1 | 1/2013 | Klemm |
| 2013/0060610 A1 | 3/2013 | McGurk |
| 2013/0117329 A1 | 5/2013 | Bank et al. |
| 2014/0172638 A1* | 6/2014 | El-Hmayssi ....... G06Q 30/0613 705/26.41 |

(Continued)

OTHER PUBLICATIONS

Francesco, Ricci, 'Mobile Recommender Systems', Jan. 11, 2010, University of Bolzano, pp. 1-4, 6, 11, 18-19. (Year: 2010).*

(Continued)

*Primary Examiner* — William J Allen
*Assistant Examiner* — Maria S. P. Heath
(74) *Attorney, Agent, or Firm* — Law Office of Jim Boice

(57) ABSTRACT

A processor-implemented method, system, and/or computer program product sorts and displays product reviews of ecommerce products. A system receives product reviews for ecommerce products. The product reviews are displayed on an ecommerce webpage, are generated by product reviewers, and are for different types of products. Reviewer profiles of the product reviewers are received. The reviewer profiles include characteristics of the product reviewers that affect usage of one or more of the different types of products. A user profile for a user is received. The user profile includes characteristics of the user that affect usage of one or more of the different types of products. The user profile is matched to a specific reviewer profile from the reviewer profiles. The product reviews are sorted according to the different types of products and the specific reviewer profile. The sorted product reviews are then displayed on the ecommerce webpage.

11 Claims, 5 Drawing Sheets

(56) References Cited

U.S. PATENT DOCUMENTS

| | | | | |
|---|---|---|---|---|
| 2015/0073907 A1* | 3/2015 | Purves | ............... | G06Q 20/32 |
| | | | | 705/14.58 |
| 2015/0356640 A1* | 12/2015 | Flores | ............ | G06Q 30/0625 |
| | | | | 705/26.62 |
| 2016/0078095 A1* | 3/2016 | Man | ............... | G06F 17/30528 |
| | | | | 707/689 |

OTHER PUBLICATIONS

Anonymous; Categorical Meta-Reviews for Improved Recommendations; IP.Com; Mar. 20, 2014; IPCOM000235692D, pp. 1-5.

\* cited by examiner

US 10,083,477 B2

BIOMETRIC AND GEOPHYSICAL SENSOR-BASED SORTING AND DISPLAYING OF ECOMMERCE PRODUCT REVIEWS

BACKGROUND

The present disclosure relates to the field of electronic devices, and specifically to the use of electronic devices that are used in ecommerce. Still more particularly, the present disclosure relates to electronic devices that present product reviews in ecommerce.

SUMMARY

A processor-implemented method, system, and/or computer program product sorts and displays product reviews of ecommerce products. A system receives product reviews for ecommerce products. The product reviews are displayed on an ecommerce webpage, are generated by product reviewers, and are for different types of products. Reviewer profiles of the product reviewers are received. The reviewer profiles include characteristics of the product reviewers that affect usage of one or more of the different types of products. A user profile for a user is received. The user profile includes characteristics of the user that affect usage of one or more of the different types of products. The user profile is matched to a specific reviewer profile from the reviewer profiles. The product reviews are sorted according to the different types of products and the specific reviewer profile. The sorted product reviews are then displayed on the ecommerce webpage.

DETAILED DESCRIPTION

Figure 1:
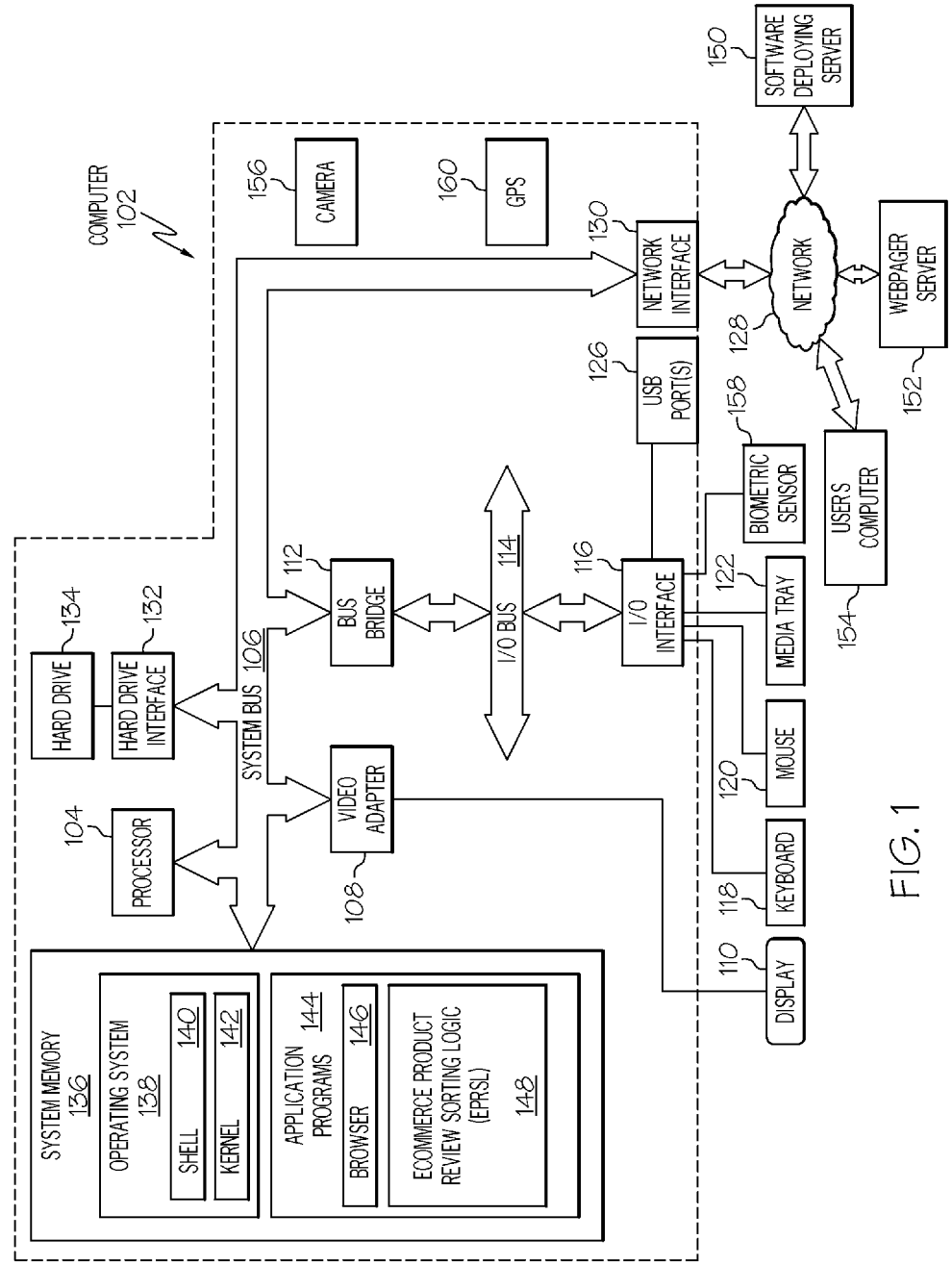
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

When shopping electronically, users tend to give much credence to reviews from people that previously purchased items they are interested in. While such reviews are useful if the user is looking at items that perform the same for everyone, there are many items (such as shoes and other clothing items, specialty products, etc.) for which reviews are specific to the purchaser's social persona. Sometimes, shoppers will buy an item that seems to be a good fit for them (size-wise) based on good reviews from everyone who bought the item, only to find that the item really doesn't work out for people with their body type or other elements of their social persona. For example, a man's dress shirt might be perfect for the tall, slender build, but not very good for a person having a broad-shouldered, short-waisted athletic build. Similarly, some shoe styles fit very well for people with narrow feet, but not for persons having a wide foot.

The present invention thus provides a mechanism for maximizing the shopping experience by incorporating reviews from shoppers with similar personas, so that the comments/reviews from others with similar personas guide them to find something that not only "would fit" them, but is satisfactory in that fit with respect to their persona.

Disclosed herein is a method for ecommerce product comments and reviews to be prioritized and the shopping experience customized based on the shopper's social persona.

The displayed reviews/comments viewed on the shopping site are dynamically changed based on the shopper's social persona. The feedback then indicates that people who match the shopper's persona (i.e., body type, specialty product usage, etc.) bought this item and gave feedback that it truly fit or at least satisfied the need of the shopper.

For example, one shopper may be pleased with a purchase of a dress for which only 3 people gave a 5-star rating (and the other 75 reviews were 2-star ratings), since those 3 people were the only ones that came close to her social persona (e.g., body type). Conversely, another shopper would be disappointed with an article of clothing that has a 99% satisfaction rating from other shoppers, since all of the other reviewing shoppers have different social personas from that shopper.

Thus, the present invention allows a shopper to better find items that fit his/her use, resulting in higher customer satisfaction and lower return rates.

In accordance with one or more embodiments of the present invention, a shopper creates a social persona for each person for whom they shop (themselves, their spouses, their children, people for whom they buy gifts). Optionally, the social persona can be provided from a common social networking site, where the shopper has selectively allowed sharing with other sites. The criteria used to define the shopper's social persona (some of which can be derived from photograph analysis) include, but are not limited to, the user's height, weight, body shape, hand/feet characteristics (size, medical conditions, etc.), hat size, etc. The persona can also have hobby or activities specifics, such as specifics about that particular person's job, sporting activities, roles, etc.

The shopper then associates one or more social personas to his/her account on a given shopping site (whether provided by local system or a social networking site).

If multiple personas are present, the system may use the default persona, unless the shopper selectively chooses an alternate persona.

If the customer/shopper inputs search terms when shopping, thus narrowing the items displayed to those that match certain criteria (name, size, color, etc.), the system displays the filtered results.

In one or more embodiments, the system displays adjusted product reviews based on the shopper's persona. Exemplary options for displaying product reviews include, but are not limited to, color-coding comments/reviews from shoppers with similar shopper personas; and/or moving comments/review from shoppers with similar shopper personas to the top of the list of comments/reviews.

When the shopper chooses to sort results based on ratings/reviews (i.e., high to low ratings), the system displays the results, and also provides an optional alternative view from the existing ecommerce experience, as adjusted according to the current shopper's persona. That is, the system may display ratings/comments/reviews from shoppers with similar shopper personas; the system may prioritize ratings/comments/reviews from shoppers with similar shopper personas above other persona types and reviews from shoppers without personas; etc.

In one embodiment of the present invention, when any shopper purchases an item and/or adds comments and reviews about an item, the shopper's persona characteristics are anonymously included in the collection of reviews, so that future shopper searches will be able to use these persona characteristics when finding reviews applicable to their own persona.

In one embodiment of the present invention, when the shopper searches for someone other than him/herself, the reviews/comments results will be dynamically customized to the gift recipient's persona and optimized for the recipient instead of the shopper.

While the invention has been described thus far as being related to clothing shopping, the present invention is applicable to any type of specialty shopping.

For example, the social persona for kayaking specialists could include which kinds of kayaks (sit-in, sit-on-top), types of waters kayaked (lakes, ocean, sound), activities preferred (fishing, sightseeing), height (including long torso, short torso, long legs), level of expertise, etc. Thus, when searching for accessories, these factors would be taken into account when reviews/comments are included.

While the present invention has been described thus far to match social personas of persons to particular product reviews, social personas of animals can also be utilized. The social persona of certain types of animals for purchasing pet supplies (which are typically organized by species, breed, size) could include the kinds of temperament (aggressive, docile, relaxed, excitable), people preferences (adults only, loves kids, etc.), etc.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 102 may be utilized by software deploying server 150 and/or webpage server 152 and/or user's computer 154.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, webpage server 152, and/or user's computer 154 using a network interface 130. Network interface 130 is a hardware network interface, such as a network interface card (NIC), etc. Network 128 may be an external network such as the Internet, or an internal network such as an Ethernet or a virtual private network (VPN). In one or more embodiments, network 128 is a wireless network, such as a Wi-Fi network.

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include an ecommerce product review sorting logic (EPRSL) 148. EPRSL 148 includes code for implementing the processes described below, including those described in FIGS. 2-5. In one embodiment, computer 102 is able to download EPRSL 148 from software deploying server 150, including in an on-demand basis, wherein the code in EPRSL 148 is not downloaded until needed for execution. In one embodiment of the present invention, software deploying server 150 performs all of the functions associated with the present invention (including execution of EPRSL 148), thus freeing computer 102 from having to use its own internal computing resources to execute EPRSL 148.

Also within computer 102 is a camera 156, which is capable of capturing still photos or moving video, preferably in a digital format such as a joint photographic experts group (JPEG) format or a moving picture experts group (MPEP) format.

In accordance with one or more embodiments of the present invention, also within computer 102 is at least one biometric sensor 158. Examples of biometric sensor 158 include, but are not limited to, a blood pressure/pulse monitor (e.g., a pressure/sound sensor that detects the pulse and/or blood pressure of the holder of an electronic device such as a smart phone), a skin sensor (e.g., a resistance sensor that measures a galvanic skin response from the user/holder sweating while holding an electronic device such as a smart phone), pupil dilation detector (e.g., used with camera 156 to capture an image of the user/holder's eye pupils to indicate various emotions that are known to be associated with pupil dilation and/or pupil contraction), a microphone (e.g., to detect a breathing pattern of the holder of an electronic device such as a smart phone), etc. Thus, biometric sensor 158 is an electronic device for gathering biometric data associated with a human. Biometric data is data describing a physiological state, physical attribute, or measurement of a physiological condition of a person.

In one or more embodiments of the present invention, computer 102 may include a positioning system, such as the depicted global positioning system (GPS) 160, which is a space-based satellite navigation system that provides location information for a GPS-enabled device, such as a smart phone. In another embodiment, the positioning system is a positioning system that utilizes signals from local transmitters. These local signals are triangulated to determine the real-time position/location of computer 102.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
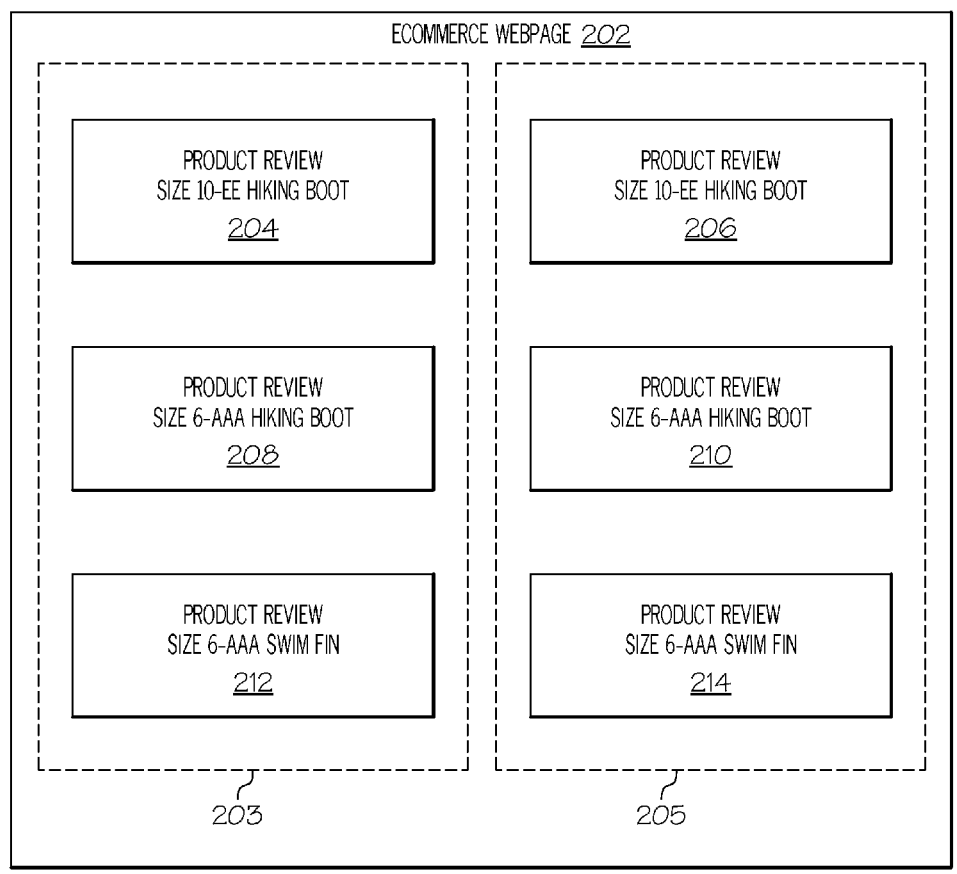
FIG. 2 illustrates an exemplary ecommerce webpage showing traditionally sorted product reviews.

With reference now to FIG. 2, an exemplary ecommerce webpage 202 showing traditionally sorted product reviews is presented. As depicted in FIG. 2, the ecommerce webpage 202 shows six product reviews for three products. Product reviews 204, 208, and 212 were created by a product reviewer 203. Product reviews 206, 210, and 214 were created by a product reviewer 205. Product reviews 204/206 are for a hiking boot that comes in size 10-EE. Product reviews 208/210 are for a hiking boot that comes in size 6-AAA. Product reviews 212/214 are for a swim fin that comes in a small size (equivalent to 6-AAA in a shoe). Without the present invention, the shopper would have to look at each of the different product reviews 204-214 and decide whether or not they are relevant to his/her shopping needs.

Figure 3:
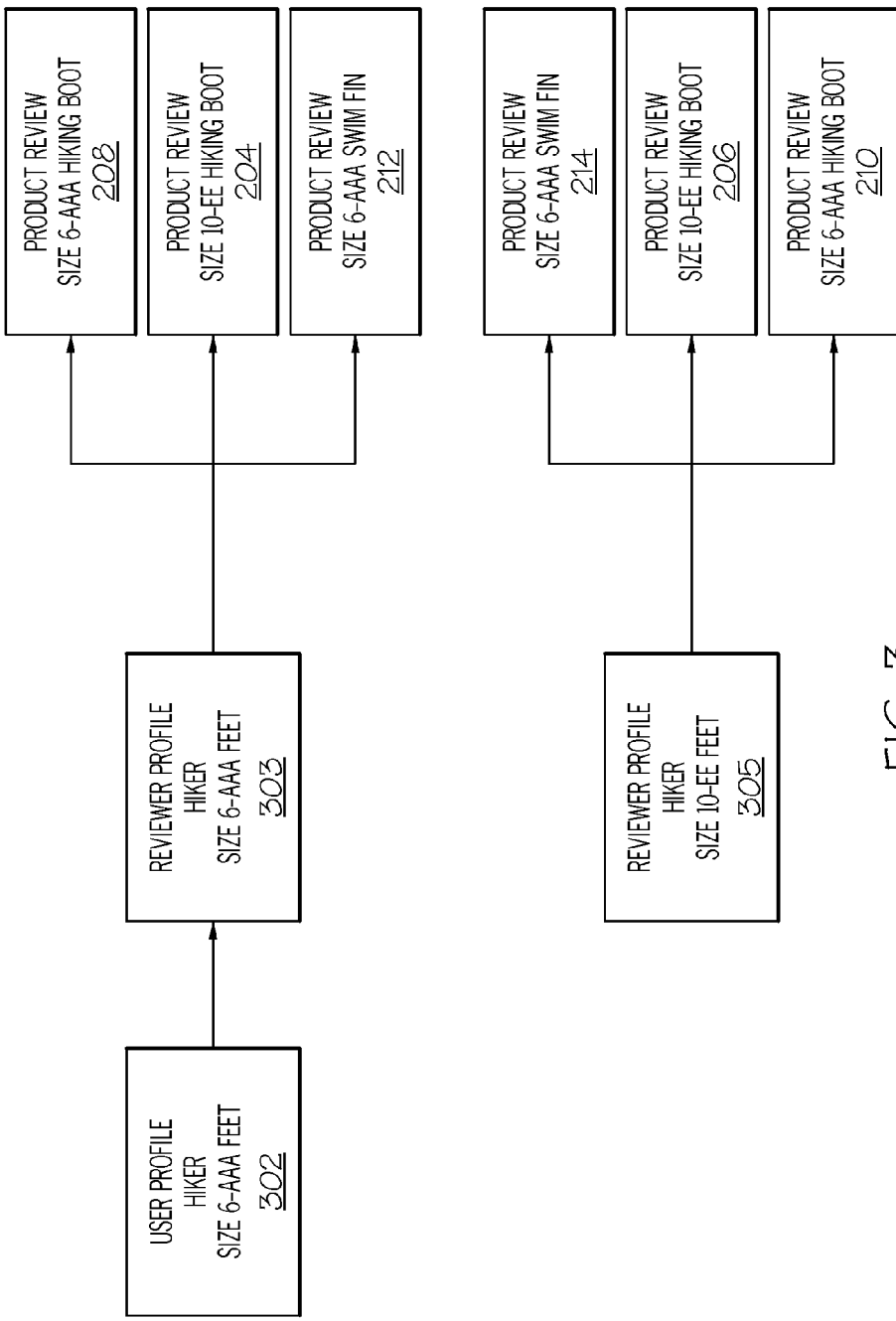
FIG. 3 depicts a mapping of a user profile to a reviewer profile to sorted product reviews in accordance with one or more embodiments of the present invention.

Thus, with reference now to FIG. 3, a mapping of a user profile 302 to a reviewer profile 303 (for the reviewer 203 described in FIG. 2) to sorted product reviews is presented. Note that the user profile 302 shows that this user/shopper is a hiker (e.g., likes to go backpacking) and wears a size 6-AAA shoe. The reviewer profile 303 of a product reviewer 203 on an ecommerce website shows that this particular reviewer is also a hiker and also wears a size 6-AAA shoe. Thus, user profile 302 is a good match to the reviewer profile 303. However, the reviewer profile 305 (for the product reviewer 205 discussed in FIG. 2) is for a person who is a swimmer, not a hiker, and who wears a size 10-EE shoe, not a size 6-AAA shoe. Thus, reviewer profile 305 is not a good match to the user profile 302 (and thus there is no mapping/matching arrow going from user profile 302 to reviewer profile 305). Since the personas of the user represented by user profile 302 do not match those of the reviewer 205, the opinions of reviewer 205 are not as valuable to the user represented by user profile 302 as those of reviewer 203.

Note further that the reviewer profiles 303/305 are mapped to an order/sorting of product reviews, based on the content of the reviewer profiles 303/305. That is, the reviewer 203 represented by reviewer profile 303 is a hiker who wears a size 6-AAA shoe. Thus, his/her opinion about a size 6-AAA hiking boot (product review 208) is valued, since this fits the persona of reviewer 203. However, if reviewer 203 has (probably erroneously) received a pair of size 10-E hiking boots (product review 204), then his/her opinion would not be as valuable. Nonetheless, reviewer 203 could still comment on the construction, quality, design of the size 10-EE hiking boot, making his/her opinion still useful.

However, the product review 212 for a swim fin is likely to be less valuable, since there is nothing in the reviewer profile 303 for reviewer 203 to indicate that he is a swimmer, skin diver, etc.

Figure 4:
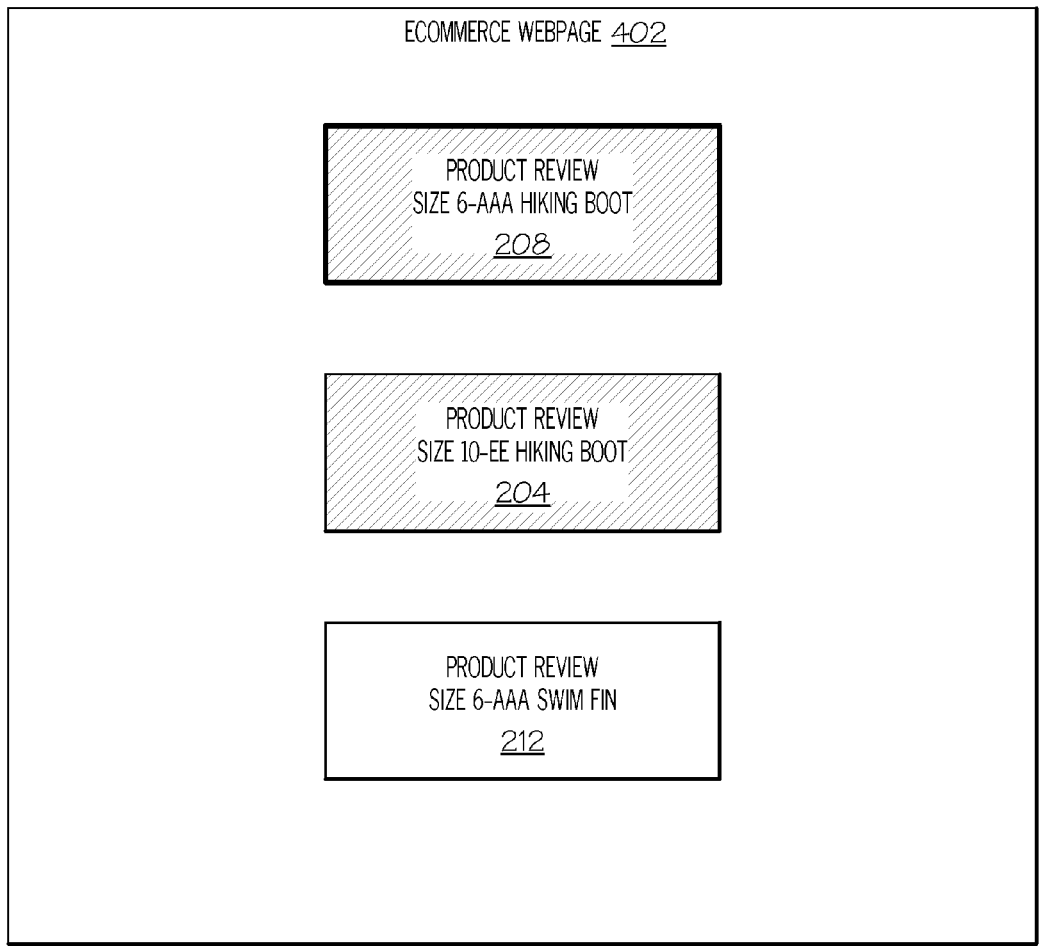
FIG. 4 illustrates the sorted product reviews being displayed in order on an ecommerce webpage.

Based on the mappings shown in FIG. 3, the ecommerce webpage 202 shown in FIG. 2 is modified to become the ecommerce webpage 402 shown in FIG. 4. That is, as shown in FIG. 3, the product reviews 204, 208, and 212 shown sorted in FIG. 3 are now displayed in this same sorted order in ecommerce webpage 402. Note that in one embodiment, the product reviews 206, 210, and 214 created by the user 205 are removed from the improved ecommerce webpage 402 shown in FIG. 4.

Referring again to FIG. 3, note again that the user profile 302 is not mapped to the reviewer profile 305, due to the disparity between the features found in user profile 302 and reviewer profile 305. However, the product reviews 206, 210, and 214 created by the reviewer 205 (represented by reviewer profile 305) are also sorted in a manner similar to those of reviewer 203. That is, since reviewer 205 is a swimmer (as indicated by her reviewer profile 305), then she is competent to opine on the quality of swim fins (product review 214), even though they are not in her size. Thus, product review 214 is rated higher than both product review 206 and product review 210 generated by reviewer 205, since there is nothing in her reviewer profile 305 to indicate that she is a hiker who would know something about hiking boots.

Figure 5:
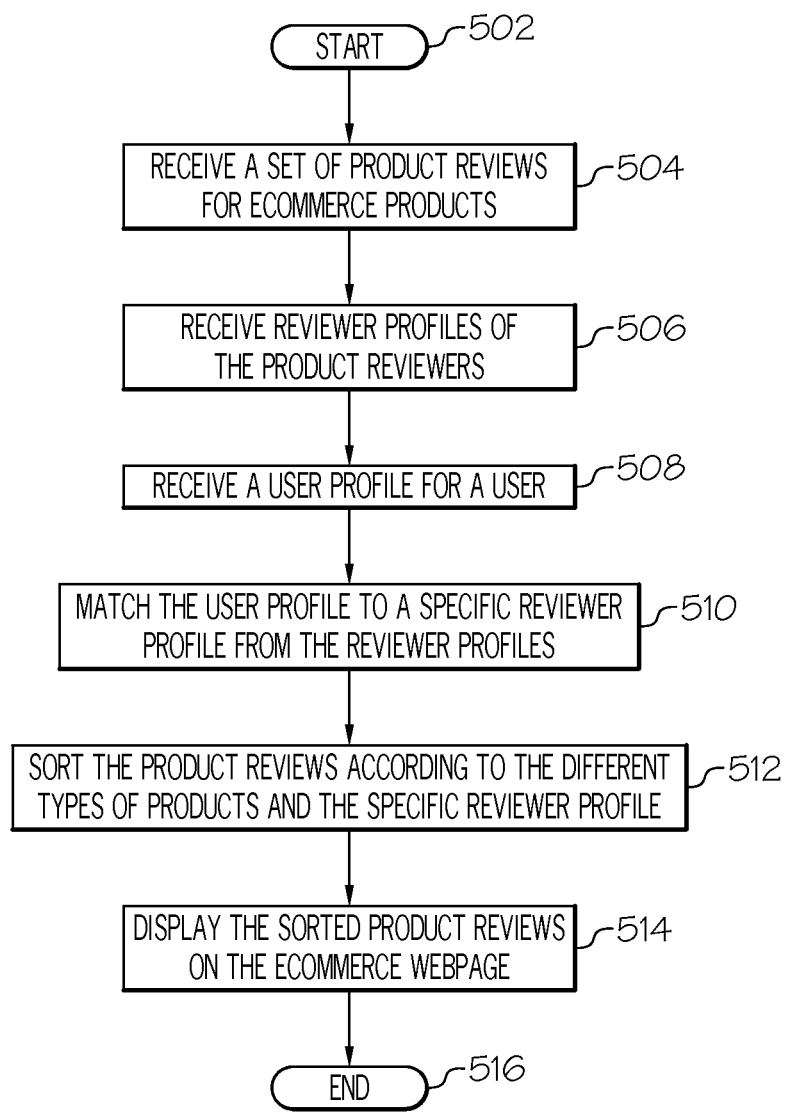
FIG. 5 is a high-level flow chart of one or more steps performed by one or more processors to sort and display ecommerce product reviews.

With reference now to FIG. 5, a high-level flow chart of one or more steps performed by one or more processors to sort and display ecommerce product reviews is presented.

After initiator block 502, one or more processors (e.g., from computer 102 shown in FIG. 1) receive a set of product reviews for ecommerce products (e.g., the product reviews shown in FIG. 2 displayed on ecommerce webpage 202), as described in block 504. The product reviews are generated by product reviewers (e.g., product reviewers 203/205 discussed in FIG. 2). The product reviews are for different types of products (e.g., boots, swim fins, etc.)

As described in block 506, one or more processors receive reviewer profiles (e.g., elements 303/305 shown in FIG. 3) of the product reviewers. The reviewer profiles show characteristics of the product reviewers that affect usage of one or more of the different types of products. For example, if a reviewer profile shows that the reviewer is a hiker, then this characteristic affects how the reviewer will actually use the particular product. That is, a hiker will use a hiking boot for backpacking, but likely would not use a hiking boot to walk around a shopping mall. Thus, another hiker will trust this reviewer's opinion about the hiking boots.

The reviewer profile (see elements 303/305 in FIG. 3) may be from metadata in the product reviews shown in FIG. 2, or they may come from a database that allows the identity of the reviewer (e.g., reviewer 203 or 205 discussed in FIG. 2) to be mapped to profile characteristics found in that database.

Returning now to FIG. 5 and as described in block 508, one or more processors receive a user profile (e.g., user profile 302 shown in FIG. 3) for a user. The user profile includes characteristics of the user that affect usage of one or more of the different types of products, just as the reviewer's characteristics affected the usage of the products. The user's profile may be derived from information provided by the user when he/she accesses the ecommerce webpage (e.g., ecommerce webpage 202 in FIG. 2), either manually (e.g., by answering prompted questions on the ecommerce webpage, or automatically based on a profile stored for a particular user's login information, identifier, etc.

As described in block 510, one or more processors match the user profile to a specific reviewer profile from the reviewer profiles, as shown in FIG. 3. As also shown in FIG. 3, one or more processors, then sort the product reviews according to the different types of products and the specific reviewer profile; (block 512). As described in block 514, the sorted product reviews are then displayed on the ecommerce webpage (see FIG. 4). The flow-chart in FIG. 5 terminates at terminator block 516.

In one embodiment of the present invention, one or more processors receive a biometric reading for the user from a biometric sensor (e.g., biometric sensor 158 when part of the user's computer 154 shown in FIG. 1). These biometric readings are then used to further define the user profile. For example, assume that the biometric sensor is a blood pressure monitor. If the blood pressure monitor shows that the user has high blood pressure, then this factor is automatically incorporated into the user profile 302 shown in FIG. 3. Based on this incorporated factor, if a product reviewer also has high blood pressure, and the product being reviewed is a blood pressure lowering medication (such that the having high blood pressure affects how the reviewer uses the medication), then the opinions of this reviewer will be deemed to be more valuable to the user.

In one embodiment of the present invention, one or more processors receive a geophysical location reading for the user from a geophysical sensor (e.g., the GPS 160 shown in FIG. 1, assuming that it is incorporated into the architecture of user's computer 154 shown in FIG. 1). The processors then utilize the geophysical location reading from the user to further define the user profile. For example, assume that the GPS sensor shows that the user (e.g., a person who is looking at the ecommerce webpage) is currently in Alaska. If the product reviewer is also from Alaska, and the product being reviewed is a hiking boot, then the user/shopper will trust the reviewer to know about hiking in cold/snow in Alaska, thus making the reviewer's opinion about that hiking boot more valued/trusted.

In one embodiment of the present invention, the user profile is for a viewer of the ecommerce webpage. In another embodiment, the user profile is for a third party chosen by a viewer of the ecommerce webpage. That is, the user profile 302 may be for a shopper who is actually looking at the ecommerce webpage, or it may be a friend/family member/pet/etc. that the shopper is shopping for.

In one embodiment of the present invention, one or more processors visually modify the sorted product reviews based on the user profile. For example, as shown in FIG. 4, product review 208 (which is the highest in the sort) is shaded and has a bold border, while next lower ranked/sorted product review 204 is only shaded, while the lowest ranked/sorted product review 212 has no visual enhancement.

In one embodiment of the present invention, the processors remove any product reviews from the ecommerce webpage that are from product reviewers whose reviewer profiles do not match the user profile, as shown in FIG. 4.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
   receiving, by one or more processors, product reviews for ecommerce products, wherein the product reviews are displayed on an ecommerce webpage, wherein the product reviews are generated by product reviewers, and wherein the product reviews are for different types of products;
   receiving, by one or more processors, reviewer profiles of the product reviewers, wherein the reviewer profiles comprise characteristics of the product reviewers that affect usage of one or more of the different types of products;
   receiving, by one or more processors, a user profile for a user, wherein the user profile comprises characteristics of the user that affect usage of one or more of the different types of products;
   receiving, by one or more processors, a biometric reading for the user from a biometric sensor, wherein the biometric sensor is a blood pressure monitor that measures blood pressure of the user, and wherein the sorted product reviews are for blood pressure lowering medication;
   receiving, by one or more processors, a geophysical location reading for the user from a geophysical sensor;
   utilizing, by one or more processors, the biometric reading from the biometric sensor and the geophysical location reading from the geophysical sensor to further define the user profile;

matching, by one or more processors, the further defined user profile to a specific reviewer profile from the reviewer profiles;

sorting, by one or more processors, the product reviews according to the different types of products and the specific reviewer profile, wherein the sorting sorts the product reviews according to how closely a product reviewer profile matches the further defined user profile to create a ranking of the product reviews;

visually modifying, by one or more processors, the sorted product reviews based on the further defined user profile, wherein said visually modifying displays a highest ranked product review with shading and a bold border, wherein said visually modifying displays a next lower ranked product review with shading but no bold border, and wherein said visually modifying displays a lowest ranked product review with no visual enhancement; and displaying, by one or more processors, the visually modified sorted product reviews on the ecommerce webpage.

2. The method of claim 1, wherein the further defined user profile is for a viewer of the ecommerce webpage.

3. The method of claim 1, wherein the further defined user profile is for a third party chosen by a viewer of the ecommerce webpage.

4. The method of claim 1, further comprising:
removing, by one or more processors, any product reviews from the ecommerce webpage that are from product reviewers whose reviewer profiles do not match the further defined user profile.

5. A computer program storage device, the computer program storage device comprising a non-transitory computer readable storage medium having program code embodied therewith, the program code readable and executable by a processor to perform a method comprising:
receiving product reviews for ecommerce products, wherein the product reviews are displayed on an ecommerce webpage, wherein the product reviews are generated by product reviewers, and wherein the product reviews are for different types of products;
receiving reviewer profiles of the product reviewers, wherein the reviewer profiles comprise characteristics of the product reviewers that affect usage of one or more of the different types of products;
receiving a user profile for a user, wherein the user profile comprises characteristics of the user that affect usage of one or more of the different types of products;
receiving a biometric reading for the user from a biometric sensor, wherein the biometric sensor is a blood pressure monitor that measures blood pressure of the user, and wherein the sorted product reviews are for blood pressure lowering medication;
receiving a geophysical location reading for the user from a geophysical sensor;
utilizing the biometric reading from the biometric sensor and the geophysical location reading from the geophysical sensor to further define the user profile;
matching the further defined user profile to a specific reviewer profile from the reviewer profiles;
sorting the product reviews according to the different types of products and the specific reviewer profile, wherein the sorting sorts the product reviews according to how closely a product reviewer profile matches the further defined user profile to create a ranking of the product reviews;
visually modifying the sorted product reviews based on the further defined user profile; and
displaying the visually modified sorted product reviews on the ecommerce webpage.

6. The computer program storage device of claim 5, wherein the further defined user profile is for a viewer of the ecommerce webpage.

7. The computer program storage device of claim 5, wherein the further defined user profile is for a third party chosen by a viewer of the ecommerce webpage.

8. The computer program storage device of claim 5, wherein the method further comprises:
removing any product reviews from the ecommerce webpage that are from product reviewers whose reviewer profiles do not match the further defined user profile.

9. A computer system comprising:
a processor, a computer readable memory, and a non-transitory computer readable storage medium;
first program instructions to receive product reviews for ecommerce products, wherein the product reviews are displayed on an ecommerce webpage, wherein the product reviews are generated by product reviewers, and wherein the product reviews are for different types of products;
second program instructions to receive reviewer profiles of the product reviewers, wherein the reviewer profiles comprise characteristics of the product reviewers that affect usage of one or more of the different types of products;
third program instructions to receive a user profile for a user, wherein the user profile comprises characteristics of the user that affect usage of one or more of the different types of products;
fourth program instructions to receive a biometric reading for the user from a biometric sensor, wherein the biometric sensor is a blood pressure monitor that measures blood pressure of the user, and wherein the sorted product reviews are for blood pressure lowering medication;
fifth program instructions to receive a geophysical location reading for the user from a geophysical sensor;
sixth program instructions to utilize the biometric reading from the biometric sensor and the geophysical location reading from the geophysical sensor to further define the user profile;
seventh program instructions to match the further defined user profile to a specific reviewer profile from the reviewer profiles;
eighth program instructions to sort the product reviews according to the different types of products and the specific reviewer profile, wherein the sorting sorts the product reviews according to how closely a product reviewer profile matches the further defined user profile to create a ranking of the product reviews;
ninth program instructions to visually modify the sorted product reviews based on the further defined user profile; and
tenth program instructions to display the visually modified sorted product reviews on the ecommerce webpage; and wherein
the first, second, third, fourth, fifth, sixth, seventh, eighth, ninth, and tenth program instructions are stored on the non-transitory computer readable storage medium for execution by one or more processors via the computer readable memory.

10. The computer system of claim 9, wherein the further defined user profile is for a third party chosen by a viewer of the ecommerce webpage.

11. The computer system of claim 9, further comprising:
eleventh program instructions to remove any product reviews from the ecommerce webpage that are from product reviewers whose reviewer profiles do not match the further defined user profile; and wherein
the eleventh program instructions are stored on the non-transitory computer readable storage medium for execution by one or more processors via the computer readable memory.

\* \* \* \* \*